(12) United States Patent
Lee et al.

(10) Patent No.: US 10,150,101 B2
(45) Date of Patent: Dec. 11, 2018

(54) PASTE FOR MANUFACTURING PHOTOCATALYST AND MANUFACTURING METHOD OF PHOTOCATALYST

(71) Applicant: National Tsing Hua University, Hsinchu (TW)

(72) Inventors: Kuan-Ting Lee, Hsinchu (TW); Shih-Yuan Lu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 267 days.

(21) Appl. No.: 15/174,894

(22) Filed: Jun. 6, 2016

(65) Prior Publication Data

US 2017/0304806 A1    Oct. 26, 2017

(30) Foreign Application Priority Data

Apr. 22, 2016   (TW) .............................. 105112609 A (51) Int. Cl.
*B01J 23/58*   (2006.01)
*B01J 23/745*  (2006.01)
(Continued)

(52) U.S. Cl.
CPC .......... *B01J 23/745* (2013.01); *B01J 23/005* (2013.01); *B01J 23/70* (2013.01); *B01J 23/80* (2013.01); *B01J 23/835* (2013.01); *B01J 23/8892* (2013.01); *B01J 23/8906* (2013.01); *B01J 35/002* (2013.01); *B01J 35/004* (2013.01); *B01J 35/0013* (2013.01); *B01J 37/009* (2013.01); *B01J 37/0072* (2013.01); *B01J 37/036* (2013.01); *B01J 37/038* (2013.01);
(Continued)

(58) Field of Classification Search
CPC .... B01J 23/745; B01J 35/0013; B01J 35/004; B01J 37/0072; B01J 37/04; B01J 37/009; B01J 37/038; C01G 49/0081; C02F 1/725; C02F 2305/10
USPC ......................................................... 502/303
See application file for complete search history.

(56) References Cited

U.S. PATENT DOCUMENTS 6,756,124 B2   6/2004   Kanamori et al.
8,241,604 B2   8/2012   Chung et al.

FOREIGN PATENT DOCUMENTS

CN   100546915   10/2009
CN   103011264   4/2013
(Continued)

OTHER PUBLICATIONS

Lee et al. "SnO2 Quantum Dots Synthesized with a Carrier Solvent Assisted Interfacial Reaction for Band-Structure Engineering of TiO2 Photocatalysts" Jun. 19, 2014 J. Phys. Chem. C 118, 26, 14457-14463 (Year: 2014).*

(Continued)

*Primary Examiner* — Haytham Soliman
(74) *Attorney, Agent, or Firm* — J.C. Patents (57) ABSTRACT

A paste for manufacturing a photocatalyst is provided. The paste for manufacturing the photocatalyst includes an alcohol paste and a photocatalyst precursor. The photocatalyst precursor is dispersed in the alcohol paste, and the photocatalyst precursor includes a first metal precursor and a second metal precursor, wherein the first metal in the first metal precursor includes Zn, Sn, Cu, Fe, Mn, Ni, Co or Ag, and the second metal in the second metal precursor includes Fe.

8 Claims, 6 Drawing Sheets

(51) Int. Cl.
  *B01J 35/00* (2006.01)
  *B01J 37/00* (2006.01)
  *B01J 37/03* (2006.01)
  *B01J 37/04* (2006.01)
  *C01G 49/00* (2006.01)
  *C02F 1/72* (2006.01)
  *B01J 23/889* (2006.01)
  *B01J 23/00* (2006.01)
  *B01J 23/70* (2006.01)
  *B01J 23/80* (2006.01)
  *B01J 23/835* (2006.01)
  *B01J 23/89* (2006.01)
  *C02F 1/32* (2006.01)

(52) U.S. Cl.
  CPC .......... *B01J 37/04* (2013.01); *C01G 49/0081* (2013.01); *C02F 1/32* (2013.01); *C02F 1/725* (2013.01); *C01P 2002/72* (2013.01); *C01P 2004/03* (2013.01); *C01P 2006/90* (2013.01); *C02F 2305/10* (2013.01); *Y02W 10/37* (2015.05)

(56) References Cited

FOREIGN PATENT DOCUMENTS

| | | |
|---|---|---|
| TW | I359698 | 3/2012 |
| TW | I430837 | 3/2014 |

OTHER PUBLICATIONS

Yao et al. "Facile synthesis of magnetic ZnFe2O4-reduced graphene oxide hybrid and its photo-Fenton-like behavior under visible iradiation" Feb. 26, 2014, Environ Sci Pollut Res (2014) 21:7296-7306 (Year: 2014).*

"Office Action of Taiwan Counterpart Application", dated Oct. 19, 2016, p. 1-p. 5.

* cited by examiner

PASTE FOR MANUFACTURING PHOTOCATALYST AND MANUFACTURING METHOD OF PHOTOCATALYST

CROSS-REFERENCE TO RELATED APPLICATION

This application claims the priority benefit of Taiwan application Ser. No. 105112609, filed on Apr. 22, 2016. The entirety of the above-mentioned patent application is hereby incorporated by reference herein and made a part of this specification.

BACKGROUND OF THE INVENTION

Field of the Invention

The invention relates to a paste, and more specifically, to a paste for manufacturing a photocatalyst and a manufacturing method of a photocatalyst using the paste.

Description of Related Art

Water scarcity is one of the top ten issues faced by humanity in the 21st century, wherein wastewater recycling is considered one means to solve the issue of water resource. However, the recycling of wastewater requires an effective wastewater treatment method. In general, the wastewater treatment method can roughly be divided into the three main categories of physical, chemical, and biological. The traditional wastewater treatment technique includes, for instance, activated carbon adsorption methods, chemical oxidation methods, biological treatment methods, ion exchange, and thin film methods. In industrial applications, a chemical oxidation method is generally used. Based on the type of the oxidant used, the chemical oxidation method can generally be divided into the four types of an air oxidation method, an ozone oxidation method, a chemical oxidation method, and an advanced oxidation method, wherein the advanced oxidation method has received the most attention as a water treatment method by industries and academia in recent years due to advantages such as fast reaction and lack of restriction by pollutant concentration. The treatment process of the advanced oxidation method mainly includes the oxidation of an organic substance by produced hydroxyl radicals having high oxidative capability to achieve the effect of removing pollutants.

Currently, the advanced oxidation method generally used by industries includes the Fenton method, ozone oxidation method, high-efficiency electrolytic oxidation method, wet oxidation method, and photo-oxidation method using titanium dioxide ($TiO_2$). However, the methods all have disadvantages, such that in actual applications, numerous limitations exist, thus rendering the methods ineffective. For instance, the Fenton method produces iron sludge causing environmental pollution and difficulty in recycling, and $TiO_2$ only works by absorbing UV-range wavelengths, and a general light source cannot be effectively used, and therefore the photo-oxidation method using $TiO_2$ is limited by the wavelength of the irradiation light and is expensive. Accordingly, providing a photocatalyst capable of rapidly treating wastewater without causing environmental pollution and is convenient to use and operate and a manufacturing method thereof is a current topic of active research for those skilled in the art.

SUMMARY OF THE INVENTION

The invention provides a paste for manufacturing a photocatalyst having a simple manufacturing method and high usability, and by applying the paste in a manufacturing method of a photocatalyst, the operating convenience of the manufacturing method is high and an organic solvent harmful to the environment is not needed. As a result, harm to, for instance, the environment and organisms is prevented and applicability is increased. Moreover, a photocatalyst capable of rapidly treating pollutants and absorbing sunlight to produce good catalytic effects without polluting the environment can be manufactured.

A paste for manufacturing a photocatalyst of the invention includes an alcohol paste and a photocatalyst precursor. The photocatalyst precursor is dispersed in the alcohol paste, and the photocatalyst precursor includes a first metal precursor and a second metal precursor, wherein the first metal in the first metal precursor includes Zn, Sn, Cu, Fe, Mn, Ni, Co or Ag, and the second metal in the second metal precursor includes Fe.

In an embodiment of the invention, based on 100 parts by weight of the alcohol paste, the content of the first metal precursor is $3.4 \times 10^{-3}$ parts by mass to 0.2 parts by mass and the content of the second metal precursor is $1.5 \times 10^{-2}$ parts by mass to 1 part by mass.

The manufacturing method of the photocatalyst of the invention includes the following steps. A paste is provided, wherein the paste is the paste for manufacturing the photocatalyst mentioned above. The paste is brought in contact with an aqueous liquid such that the photocatalyst precursor in the paste is dissolved in the aqueous liquid to form a mixed solution containing a photocatalyst, wherein the photocatalyst includes the compound represented by formula I below:

$$A^{2+}(B^{3+})_2 X_4 \qquad \text{formula I,}$$

wherein $A^{2+}$ represents $Zn^{2+}$, $Sn^{2+}$, $Cu^{2+}$, $Fe^{2+}$, $Mn^{2+}$, $Ni^{2+}$, $Co^{2+}$, or $Ag_2^{2+}$, $B^{3+}$ represents $Fe^{3+}$, and X represents $O^{2-}$. The mixed solution containing the photocatalyst is centrifuged to obtain the photocatalyst.

In an embodiment of the invention, the preparation method of the paste includes the following steps. A photocatalyst precursor is dissolved in the alcohol to form a photocatalyst precursor solution. Calcium acetate is added in water to form a calcium acetate solution. The photocatalyst precursor solution is mixed with the calcium acetate solution.

In an embodiment of the invention, the volume ratio of the alcohol and the water is 2:1 to 3:1, the photocatalyst precursor solution includes a first metal precursor solution and a second metal precursor solution, the concentration of the first metal precursor solution is $2.3 \times 10^{-4}$ M to $1.4 \times 10^{-2}$ M, the concentration of the second metal precursor solution is $4.6 \times 10^{-4}$ M to $2.9 \times 10^{-2}$ M, and the concentration of the calcium acetate solution is 1 M to 1.5 M.

In an embodiment of the invention, the affinity of the aqueous liquid and the alcohol is greater than the affinity of the calcium acetate and the alcohol.

In an embodiment of the invention, in the step of dissolving the photocatalyst precursor in the paste in the aqueous liquid, the alcohol and the photocatalyst precursor dissolved in the alcohol are dissolved in the aqueous liquid together.

In an embodiment of the invention, the aqueous liquid includes water or aqueous sodium hydroxide.

In an embodiment of the invention, $B^{3+}$ represents $Fe^{3+}$ and the second metal precursor is a ferric compound.

In an embodiment of the invention, the particle size of the photocatalyst is 1 nm to 10 nm.

Based on the above, by including the alcohol paste and the photocatalyst precursor dispersed in the alcohol paste, the paste for manufacturing the photocatalyst of the invention is suitable for storage and transportation, and therefore has good usability. Moreover, the paste for manufacturing the photocatalyst of the invention includes the photocatalyst precursor, wherein the photocatalyst precursor includes the first metal precursor and the second metal precursor, the first metal in the first metal precursor includes Zn, Sn, Cu, Fe, Mn, Ni, Co, or Ag, and the second metal in the second metal precursor includes Fe, such that the paste for manufacturing the photocatalyst of the invention is applicable in the manufacture of a photocatalyst. Moreover, by bringing the paste for manufacturing the photocatalyst of the invention in contact with the aqueous liquid, the manufacturing method of a photocatalyst of the invention has the following advantages: high operating convenience and lack of organic solvents harmful to the environment. As a result, harm to, for instance, the environment and organisms is prevented to increase applicability, and a photocatalyst capable of rapidly treating pollutants and absorbing sunlight to produce good catalytic effects without polluting the environment can be manufactured.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the present specification, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with any numerical value and the smaller numerical range in the specification.

To manufacture a photocatalyst that can rapidly treat pollutants and absorb sunlight to produce good catalytic effects without polluting the environment, and to achieve high operating convenience of the manufacturing method without the use of an organic solvent harmful to the environment in the process so as to prevent harm to, for instance, the environment and organisms and increase applicability, the invention provides a paste for manufacturing a photocatalyst and a manufacturing method of a photocatalyst using the paste capable of achieving the above advantages. In the following, embodiments are provided to describe the paste for manufacturing the photocatalyst and the manufacturing method of a photocatalyst using the paste of the invention in detail as examples of actual implementation of the invention.

[Paste for Manufacturing Photocatalyst]

The paste for manufacturing the photocatalyst of an embodiment of the invention includes an alcohol paste and a photocatalyst precursor, wherein the photocatalyst precursor is dispersed in the alcohol paste. In other words, in the present embodiment, under room temperature, the paste for manufacturing the photocatalyst is in solid state, and is therefore suitable for storage and transportation.

Specifically, in the present embodiment, the photocatalyst precursor includes a first metal precursor and a second metal precursor, wherein the first metal in the first metal precursor includes Zn, Sn, Cu, Fe, Mn, Ni, Co or Ag, and the second metal in the second metal precursor includes Fe. More specifically, in the present embodiment, the type of the first metal precursor is not particularly limited as long as the first metal precursor can be dissolved in alcohol and can provide divalent Zn ion, Sn ion, Cu ion, Fe ion, Mn ion, Ni ion, Co ion, or Ag ion. For instance, the first metal precursor can be an organic compound, an inorganic compound, or a combination thereof. Moreover, similarly, the type of the second metal precursor is not particularly limited as long as the second metal precursor can be dissolved in alcohol and can provide trivalent Fe ion. For instance, the second metal precursor can be an organic compound, an inorganic compound, or a combination thereof.

Specifically, in an embodiment, the first metal in the first metal precursor is Cu, and the first metal precursor is $CuCl_2$; the second metal in the second metal precursor is Fe, and the second metal precursor is a ferric compound, such as $Fe(NO_3)_3$.

Moreover, in the present embodiment, based on 100 parts by weight of the alcohol paste, the content of the first metal precursor is $3.4 \times 10^{-3}$ parts by weight to 0.2 parts by weight, preferably $5.4 \times 10^{-2}$ parts by weight to 0.2 parts by weight, and the content of the second metal precursor is $1.5 \times 10^{-2}$ parts by weight to 1 part by weight, preferably $2.5 \times 10^{-1}$ parts by weight to 1 part by weight. Specifically, if the content of the first metal precursor is less than $3.4 \times 10^{-3}$ parts by weight, then a photocatalyst product is not readily produced in a subsequent manufacture process of a photocatalyst due to low content; if the content of the first metal precursor is higher than 0.2 parts by weight, then a paste cannot be formed due to high content; if the content of the second metal precursor is less than $1.5 \times 10^{-2}$ parts by weight, then a photocatalyst product is not readily produced in a subsequent manufacture process of a photocatalyst due to low content; and if the content of the second metal precursor is higher than 1 part by mass, then a paste cannot be formed due to high content.

Moreover, the manufacturing method of the paste for manufacturing the photocatalyst includes, for instance, adding the photocatalyst precursor during the manufacturing process of the alcohol paste. Specifically, the step of manufacturing the alcohol paste can be performed by any step of manufacturing an alcohol paste known to those having ordinary skill in the art.

More specifically, in an embodiment, the manufacturing method of the paste for manufacturing the photocatalyst includes the following steps. First, a photocatalyst precursor is dissolved in alcohol to form a photocatalyst precursor solution and calcium acetate is added in water to form a calcium acetate solution. In particular, the volume ratio of alcohol and water is 2:1 to 3:1, the photocatalyst precursor solution includes a first metal precursor solution and a second metal precursor solution, the concentration of the first metal precursor solution is $2.3 \times 10^{-4}$ M to $1.4 \times 10^{-2}$ M, the concentration of the second metal precursor solution is $4.6 \times 10^{-4}$ M to $2.9 \times 10^{-2}$ M, and the concentration of the calcium acetate solution is 1 M to 1.5 M. Then, the photocatalyst precursor solution is brought in contact with the calcium acetate solution. In particular, the method of bringing the photocatalyst precursor solution in contact with the calcium acetate solution includes, for instance, directly adding the photocatalyst precursor solution in the calcium acetate solution.

It should be mentioned that, as described above, since the paste for manufacturing the photocatalyst is in solid state under room temperature and is therefore suitable for storage and transportation, the paste for manufacturing the photocatalyst has good usability. Moreover, as described above, since the manufacturing method of the paste for manufacturing the photocatalyst is simple, easy to implement, and low cost, and an organic solvent harmful to the environment is not needed during the manufacture of the paste for manufacturing the photocatalyst, the paste for manufacturing the photocatalyst has the advantages of good applicability, commercial value, and environmental friendliness.

[Manufacturing Method of Photocatalyst]

The manufacturing method of a photocatalyst of an embodiment of the invention includes the following steps. First, the paste for manufacturing the photocatalyst in any embodiment above is provided. The manufacturing method of the paste for manufacturing the photocatalyst and relevant description of each component therein are described in detail in the above embodiments and are therefore not repeated herein.

Then, the paste for manufacturing the photocatalyst is brought in contact with an aqueous liquid such that the photocatalyst precursor in the paste for manufacturing the photocatalyst is dissolved in the aqueous liquid so as to form a mixed solution containing a photocatalyst, wherein the photocatalyst includes the compound represented by formula I below:

$$A^{2+}(B^{3+})_2 X_4 \qquad \text{formula I,}$$

wherein $A^{2+}$ represents $Zn^{2+}$, $Sn^{2+}$, $Cu^{2+}$, $Ni^{2+}$, $Co^{2+}$, or $Ag_2^{2+}$, $B^{3+}$ represents $Fe^{3+}$, and X represents $O^{2-}$.

Specifically, in the present embodiment, the method of bringing the paste for manufacturing the photocatalyst in contact with the aqueous liquid is not particularly limited as long as the two can be in contact with each other. Specifically, in an embodiment, the method of bringing the paste for manufacturing the photocatalyst in contact with the aqueous liquid includes: placing the paste for manufacturing the photocatalyst in a container containing the aqueous liquid; in another embodiment, the method of bringing the paste for manufacturing the photocatalyst in contact with the aqueous liquid includes: adding the aqueous liquid in a container containing the paste for manufacturing the photocatalyst.

Moreover, in the present embodiment, the affinity of the aqueous liquid and the alcohol is greater than the affinity of the calcium acetate and the alcohol. In other words, when the paste for manufacturing the photocatalyst is in contact with the aqueous liquid, alcohol in the paste for manufacturing the photocatalyst tends to flow out of the paste and be dissolved in the aqueous liquid on the contact interface between the paste for manufacturing the photocatalyst and the aqueous liquid. As a result, alcohol is dissolved in the aqueous liquid along with the photocatalyst precursor dissolved therein on the contact interface of the paste for manufacturing the photocatalyst and the aqueous liquid.

Moreover, in the present embodiment, the forming method of the mixed solution containing the photocatalyst is, for instance, a sol-gel method. Specifically, in the present embodiment, when the photocatalyst precursor is dissolved in the aqueous liquid, hydrolysis and a polycondensation reaction occur to the photocatalyst precursor and the aqueous liquid such that a mixed solution containing a photocatalyst is formed, wherein the aqueous liquid includes, for instance, water or aqueous sodium hydroxide. From another perspective, in the present embodiment, the photocatalyst is a sol-gel product.

Moreover, in the present embodiment, the particle size of the photocatalyst is 1 nm to 10 nm, indicating the photocatalyst is a nanoscale sol-gel particle. More specifically, in the present embodiment, the particle size of the photocatalyst can be adjusted according to the rate that alcohol passes through the contact interface of the paste for manufacturing the photocatalyst and the aqueous liquid, wherein when the rate is greater, the particle size is smaller; and when the rate is lower, the particle size is larger. In other words, those having ordinary skill in the art can suitably adjust the particle size of the photocatalyst within a suitable range according to subsequent application requirements.

Moreover, in the present embodiment, the compound represented by formula I is a compound having a spinel structure, wherein the spinel structure includes a normal spinel structure or an inverse spinel structure.

Moreover, in the present embodiment, preferably, A and/or B in formula I is a magnetic element such that the photocatalyst is magnetic. As a result, the photocatalyst can be used repeatedly via magnet attraction and collection. The magnet is, for instance, a permanent magnet or an electromagnet. Specifically, in an embodiment, $A^{2+}$ represents $Cu^{2+}$, $B^{3+}$ represents $Fe^{3+}$; in another embodiment, $A^{2+}$ represents $Fe^{2+}$, and $B^{3+}$ represents $Fe^{3+}$.

Moreover, in the present embodiment, the photocatalyst can absorb sunlight and produce good catalytic effects to rapidly decompose organic pollutant containing carbon, hydrogen, and oxygen. Specifically, the organic substance containing carbon, hydrogen, and oxygen includes hydrocarbon, carbohydrate, or a combination thereof, and after the organic substance containing carbon, hydrogen, and oxygen is decomposed or pyrolyzed by photocatalysis, alkyl, alcohol, or a combination thereof is produced.

Moreover, in the present embodiment, the photocatalyst can absorb sunlight and produce good catalytic effects to catalyze a reactive oxygen compound and form a highly reactive hydroxyl radical, so as to decompose organic pollutants containing carbon, hydrogen, and oxygen into water and carbon dioxide via an oxidation process. Specifically, the reactive oxygen compound includes peroxide, superoxide, or a combination thereof, but the invention is not limited thereto.

Then, the mixed solution containing the photocatalyst is centrifuged to obtain the photocatalyst. Specifically, based on the particle size of the photocatalyst, the photocatalyst can exist in the resulting precipitate or exist in the supernatant after centrifuge treatment.

Moreover, to purify the resulting photocatalyst, after the mixed solution containing the photocatalyst is centrifuged, the resulting photocatalyst may further be cleaned by using a cleaning solvent. Specifically, as long as the resulting photocatalyst is not dissolved in the cleaning solvent and the cleaning solvent is readily removed, the invention does not particularly limit the type of the cleaning solvent. Specifically, in the present embodiment, the cleaning solvent is, for instance, water, ethanol, or a combination thereof.

Moreover, to purify the resulting photocatalyst, after the mixed solution containing the photocatalyst is centrifuged, the resulting photocatalyst can be further dried by various suitable drying methods.

It should be mentioned that, as described above, since a photocatalyst can be formed in the aqueous liquid by bringing the paste for manufacturing the photocatalyst in contact with the aqueous liquid, the manufacturing method of a photocatalyst of the invention is simple, has good operating convenience, and is easy to implement. More specifically, as described above, since the manufacturing method of the paste for manufacturing the photocatalyst is also simple, easy to implement, and low cost, the manufacturing method of a photocatalyst of the invention can be readily accepted by industries.

Moreover, as described above, since an organic solvent harmful to the environment is not needed in the process of manufacturing a photocatalyst and the process of manufacturing the paste for manufacturing the photocatalyst, the manufacturing method of a photocatalyst of the invention can prevent harm to, for instance, the environment and organisms such that applicability thereof is increased.

Moreover, as described above, in addition to simple manufacturing means, good operating convenience, ease of implementation, low cost, and no harm to, for instance, the environment and organisms, the manufacturing method of a photocatalyst of the invention can also manufacture a photocatalyst producing good catalytic effects by absorbing sunlight, such that the manufacturing method of a photocatalyst of the invention has very high industrial applicability.

Moreover, as described above, the photocatalyst can absorb sunlight to produce good catalytic effects, and therefore can rapidly decompose organic pollutants containing carbon, hydrogen, and oxygen via itself or in combination with a reactive oxygen compound. In other words, the manufacturing method of a photocatalyst of the invention can manufacture a photocatalyst producing good catalytic effects by absorbing sunlight and rapidly treating pollutants without producing products polluting the environment.

More specifically, since the photocatalyst itself or the combination of the photocatalyst and a reactive oxygen compound can rapidly decompose organic pollutants containing carbon, hydrogen, and oxygen, the photocatalyst manufactured by the manufacturing method of a photocatalyst of the invention can be applied in a wastewater treatment package, a solid waste disposal package, or an air treatment package, or used as a sterilization photocatalyst.

Moreover, as described above, the photocatalyst can be magnetic and therefore can be used repeatedly via magnet attraction and collection. In other words, the manufacturing method of a photocatalyst of the invention can manufacture a photocatalyst that can be conveniently and rapidly recycled and used repeatedly.

The features of the invention are more specifically described in the following with reference to Example 1 to Example 3. Although the following examples are described, the materials used and the amount and ratio thereof, as well as handling details and handling process . . . etc., can be suitably modified without exceeding the scope of the invention. Accordingly, restrictive interpretation should not be made to the invention based on the examples provided below.

Example 1

Manufacture of Paste for Manufacturing Photocatalyst

Figure 1:
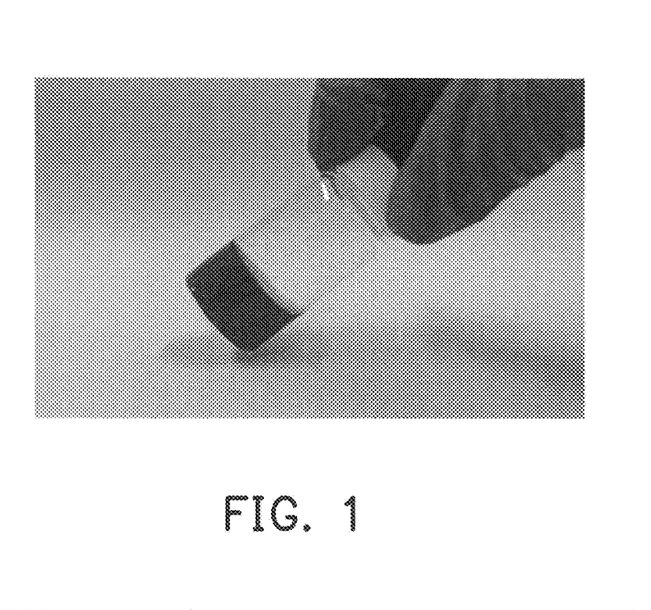
FIG. 1 is a picture of the paste for manufacturing the photocatalyst of Example 1 of the invention.

First, $1.2 \times 10^{-2}$ g of $CuCl_2$ and $6 \times 10^{-2}$ g of $Fe(NO_3)_3$ were added in a flask containing 5 ml of alcohol, and $CuCl_2$ and $Fe(NO_3)_3$ were completely dissolved to form a photocatalyst precursor solution, wherein the molar ratio of Cu ion and Fe ion is 1:2. Then, 3.5 g of calcium acetate was added in a flask containing 15 ml of water to form a calcium acetate solution. Then, the photocatalyst precursor solution was added in 2 ml of the calcium acetate solution to obtain the paste for manufacturing the photocatalyst of Example 1, as shown in FIG. 1.

Manufacture of Photocatalyst

First, the paste for manufacturing the photocatalyst of Example 1 was placed in a 20 ml flask, and $4 \times 10^{-2}$ g of NaOH was dissolved in 20 ml of distilled water to form aqueous sodium hydroxide (i.e., the aqueous liquid above). Then, under room temperature, aqueous sodium hydroxide was slowly added in the flask containing the paste for manufacturing the photocatalyst of Example 1. After the paste for manufacturing the photocatalyst of Example 1 was completely reacted to form a mixed solution containing a photocatalyst (about 60 minutes), the mixed solution containing the photocatalyst was centrifuged to obtain a precipitate. Then, the precipitate was repeatedly cleaned via suitable amounts of ethanol and deionized water and centrifuged, and the pH value was confirmed to be 7. Then, the precipitate was dried for 12 hours at a temperature of 80° C. using an oven to obtain the photocatalyst of Example 1.

Example 2

Manufacture of Paste for Manufacturing Photocatalyst

The paste for manufacturing the photocatalyst of Example 2 was manufactured using the same manufacturing process as Example 1.

Manufacture of Photocatalyst

The photocatalyst of Example 2 was manufactured using a similar manufacturing process as Example 1, and the main difference thereof is: the concentration of aqueous sodium hydroxide (i.e., the aqueous liquid above). Specifically, in Example 2, aqueous sodium hydroxide was formed by dissolving $8 \times 10^{-3}$ g of NaOH in 20 ml of distilled water.

Example 3

Manufacture of Paste for Manufacturing Photocatalyst

The paste for manufacturing the photocatalyst of Example 3 was manufactured using the same manufacturing process as Example 1.

Manufacture of Photocatalyst

The photocatalyst of Example 3 was manufactured using a similar manufacturing process as Example 1, and the main difference thereof is: in Example 3, water was slowly added in the flask containing the paste for manufacturing the photocatalyst of Example 3; and in Example 1, aqueous sodium hydroxide was slowly added in the flask containing the paste for manufacturing the photocatalyst of Example 1. In other words, in Example 3, the aqueous liquid is water.

Then, physical analysis and photodegradation analysis were performed on the photocatalysts of Example 1 to Example 3, and magnetic recovery testing was performed on the photocatalyst of Example 1.

<Physical Analysis>

Figure 2:
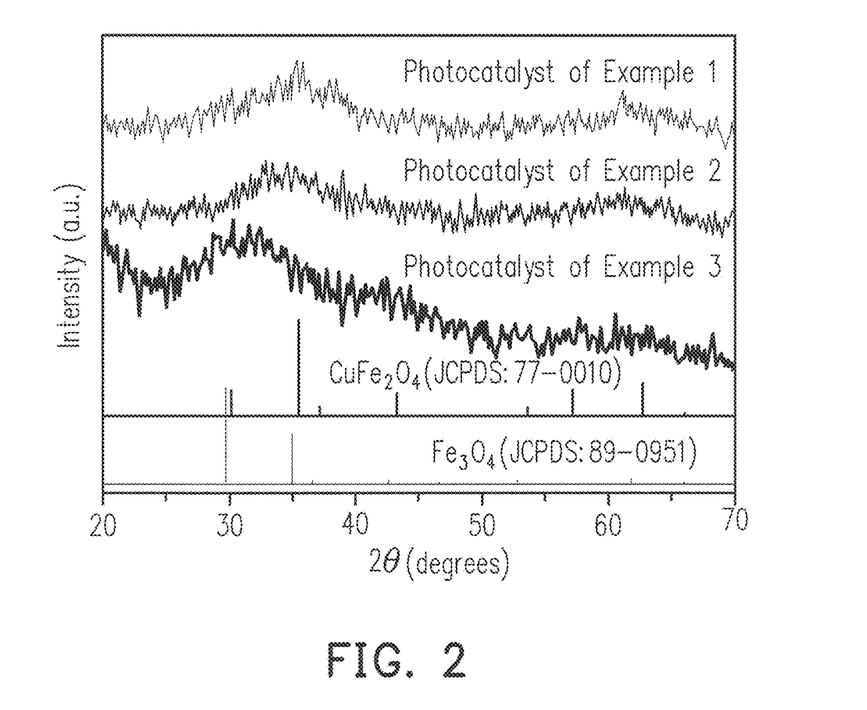
FIG. 2 is an X-ray diffraction analysis spectrum of the photocatalysts of Example 1 to Example 3 of the invention.

FIG. 2 is an X-ray diffraction analysis spectrum of the photocatalysts of Example 1 to Example 3 of the invention. Referring to FIG. 2, the photocatalysts of Example 1 and Example 2 both have the characteristic peak of $CuFe_2O_4$, and the photocatalyst of Example 3 has some $Fe_3O_4$ production since the aqueous liquid used is water. Accordingly, by bringing aqueous sodium hydroxide used as the aqueous liquid in contact with the paste can result in a photocatalyst having higher purity. Moreover, the particle sizes of the photocatalysts of Example 1 and Example 2 can be calculated via the analysis results of X-ray diffraction spectrum analysis and using a FWHM formula, wherein the particle size of the photocatalyst of Example 1 is 1.1 nm and the particle size of the photocatalyst of Example 2 is 1.4 nm.

Figure 3:
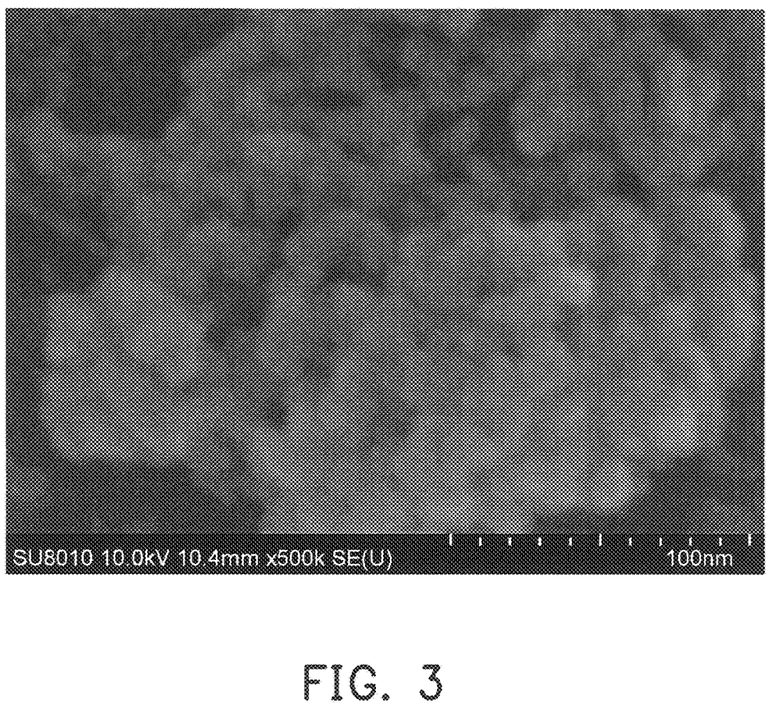
FIG. 3 is a scanning electronic microscopy (SEM) micrograph of the photocatalyst of Example 1 of the invention.

FIG. 3 is a scanning electronic microscopy (SEM) micrograph of the photocatalyst of Example 1 of the invention. It can be known from FIG. 3 that, the photocatalyst of Example 1 is adsorbed to itself and is clustered into a group, and the particle size of the photocatalyst of Example 1 is about 10 nm or less and thus the photocatalyst of Example 1 is nanoparticle.

<Photodegradation Analysis>

First, the photocatalysts of Example 1 to Example 3 were respectively prepared into sample solutions needed for the experiment, and the sample solutions respectively contain: $1.27 \times 10^{-4}$ M of a photocatalyst (the photocatalyst of Example 1, Example 2, or Example 3), 2.5 M of hydrogen peroxide ($H_2O_2$) used as a reactive oxygen compound, and 1.2 ppm of rhodamine B (RhB) used as a simulating pollutant.

Then, the sample solutions were respectively irradiated via a solar simulator (AM1.5G solar simulator, YAMASHITA DENSO, YSS-E40, irradiation energy: 100 mW/cm$^2$), and the concentration of RhB was detected under different irradiation times using a UV/VIS spectophotometer (model: GBC Cintra 2020, manufacturer: Rightek Industrial Ltd.), wherein the characteristic absorption peak of RhB is located at 554 nm.

Figure 4:
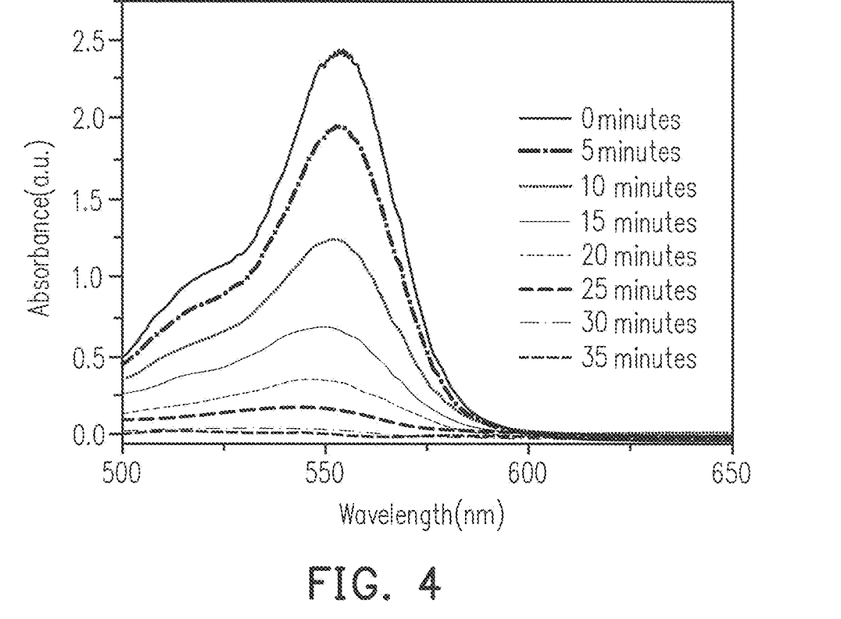
FIG. 4 is a UV-visible light absorption spectrum of RhB in a sample solution including the photocatalyst of Example 1 under different irradiation times.
Figure 5:
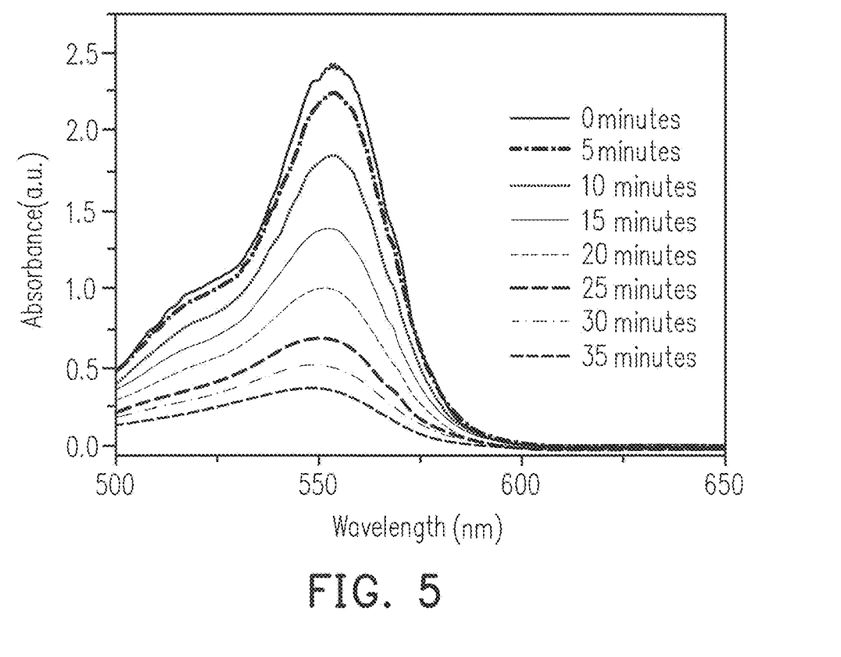
FIG. 5 is a UV-visible light absorption spectrum of RhB in a sample solution including the photocatalyst of Example 2 under different irradiation times.
Figure 6:
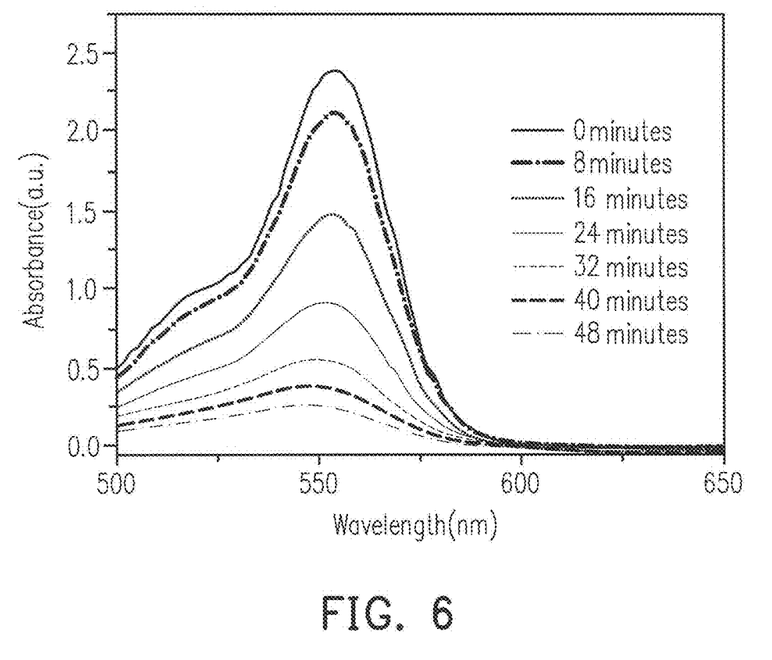
FIG. 6 is a UV-visible light absorption spectrum of RhB in a sample solution including the photocatalyst of Example 3 under different irradiation times.

FIG. 4 is a UV-visible light absorption spectrum of RhB in a sample solution including the photocatalyst of Example 1 under different irradiation times. FIG. 5 is a UV-visible light absorption spectrum of RhB in a sample solution including the photocatalyst of Example 2 under different irradiation times. FIG. 6 is a UV-visible light absorption spectrum of RhB in a sample solution including the photocatalyst of Example 3 under different irradiation times. It can be known from FIG. 4 to FIG. 6 that, as irradiation time is increased, the concentration of RhB is gradually reduced.

Figure 7:
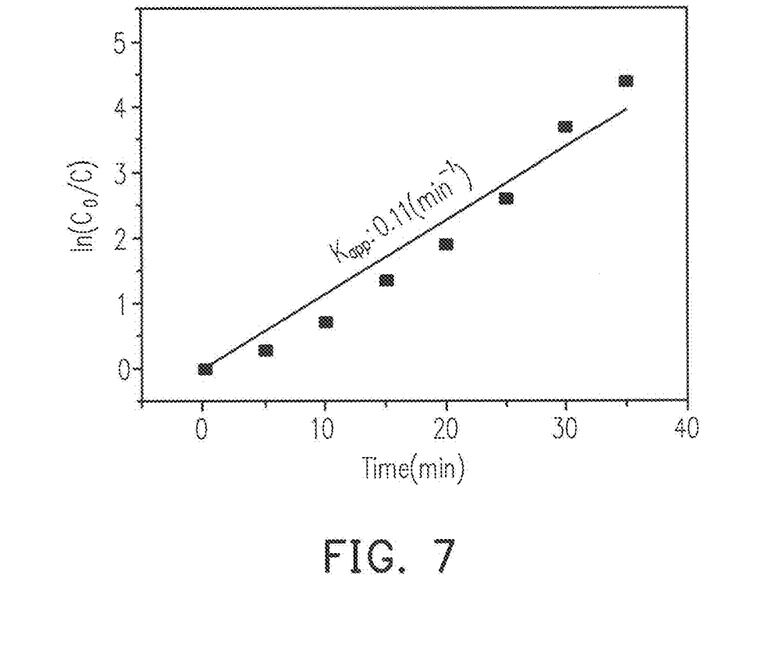
FIG. 7 is a graph showing the relationship between $\ln(C_0/C)$ and reaction time of a sample solution including the photocatalyst of Example 1 under simulated solar irradiation.
Figure 8:
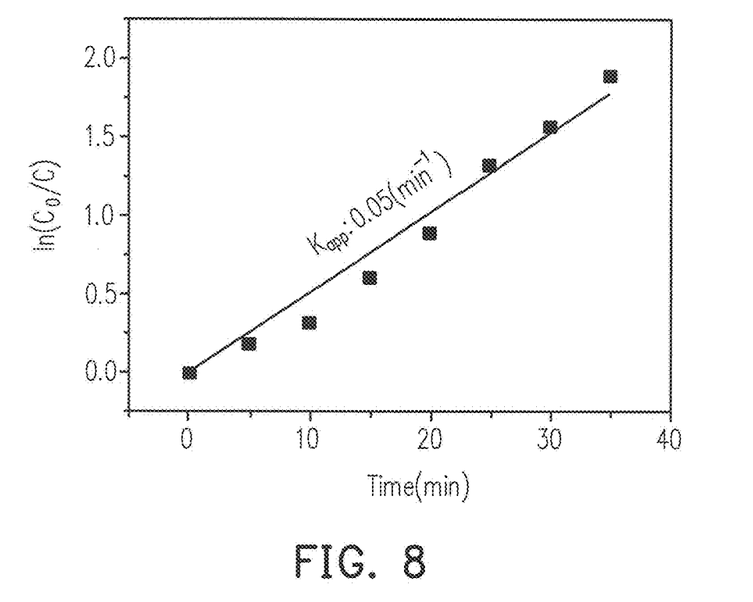
FIG. 8 is a graph showing the relationship between $\ln(C_0/C)$ and reaction time of a sample solution including the photocatalyst of Example 2 under simulated solar irradiation.
Figure 9:
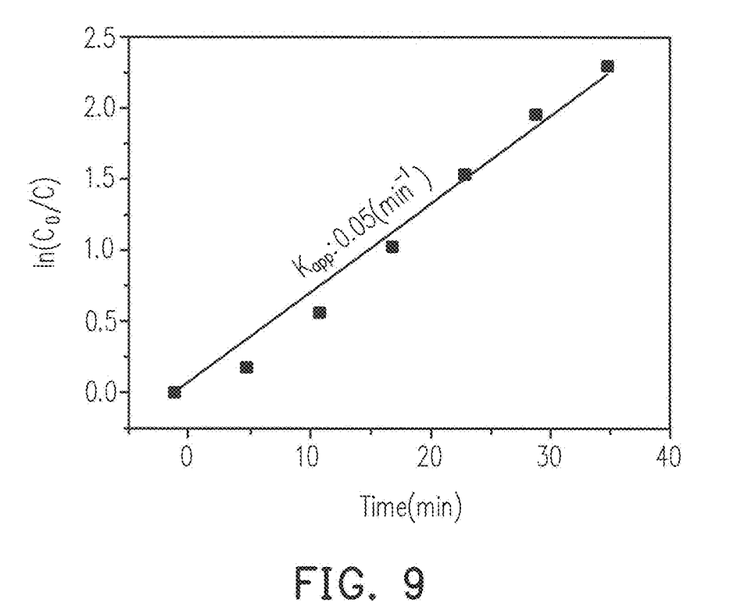
FIG. 9 is a graph showing the relationship between $\ln(C_0/C)$ and reaction time of a sample solution including the photocatalyst of Example 3 under simulated solar irradiation.

More specifically, by using the irradiation time as the horizontal axis and $\ln(C_0/C)$ ($C_0$: initial concentration of RhB, C: concentration of RhB at detection) as the vertical axis, the slope is obtained to be the reaction rate constant ($K_{app}$), wherein the reaction rate constant ($K_{app}$) represents the photodegradation effect of the photocatalyst. FIG. 7 is a graph showing the relationship between $\ln(C_0/C)$ and reaction time of a sample solution including the photocatalyst of Example 1 under simulated solar irradiation. FIG. 8 is a graph showing the relationship between $\ln(C_0/C)$ and reaction time of a sample solution including the photocatalyst of Example 2 under simulated solar irradiation. FIG. 9 is a graph showing the relationship between $\ln(C_0/C)$ and reaction time of a sample solution including the photocatalyst of Example 3 under simulated solar irradiation. It can be known from FIG. 7 to FIG. 9 that, the photocatalysts of Example 1 to Example 3 of the invention have very good photodegradation effect to RhB.

<Magnetic Recovery Testing>

Figure 10:
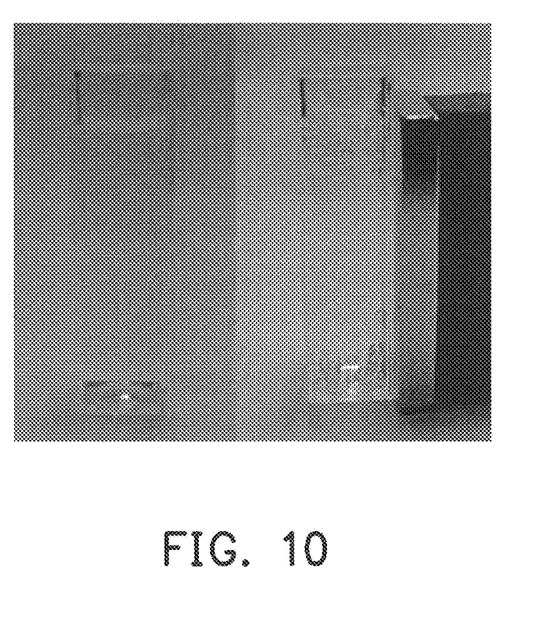
FIG. 10 shows the magnetic recovery test result of the photocatalyst of Example 1.

FIG. 10 shows the magnetic recovery test result of the photocatalyst of Example 1. It can be known from FIG. 10 that, after several hours of magnetic attraction, the photocatalyst of Example 1 suspended in water and showing cloudy appearance was attracted by a magnet and was attached to the sidewall of the flask adjacent to the magnet, leaving behind clear solution. As a result, the photocatalyst manufactured in the invention indeed is magnetic and can be attracted by a magnet. As a result, the photocatalyst manufactured in the invention can have the advantages of convenient and rapid recycling and reusability via magnetic attraction and collection.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A manufacturing method of a photocatalyst, comprising:
   providing a paste, wherein the paste comprises:
   an alcohol paste; and
   a photocatalyst precursor dispersed in the alcohol paste, wherein the photocatalyst precursor comprises a first metal precursor and a second metal precursor, wherein a first metal in the first metal precursor comprises Zn, Sn, Cu, Fe, Mn, Ni, Co or Ag, and a second metal in the second metal precursor comprises Fe;
   bringing the paste in contact with an aqueous liquid such that the photocatalyst precursor in the paste is dissolved in the aqueous liquid to form a mixed solution containing a photocatalyst, wherein the photocatalyst comprises a compound represented by formula I below:

$$A^{2+}(B^{3+})_2X_4 \qquad \text{formula I,}$$

wherein $A^{2+}$ represents $Zn^{2+}$, $Sn^{2+}$, $Cu^{2+}$, $Fe^{2+}$, $Mn^{2+}$, $Ni^{2+}$, $Co^{2+}$, or $Ag_2^{2+}$, $B^{3+}$ represents $Fe^{3+}$, X represents $O^{2-}$; and
   centrifuging the mixed solution containing the photocatalyst to obtain the photocatalyst.

2. The method of claim 1, wherein a manufacturing method of the paste comprises:
   dissolving the photocatalyst precursor in an alcohol to form a photocatalyst precursor solution;
   adding a calcium acetate in a water to form a calcium acetate solution; and
   mixing the photocatalyst precursor solution with the calcium acetate solution.

3. The method of claim 2, wherein a volume ratio of the alcohol and the water is 2:1 to 3:1, the photocatalyst precursor solution comprises a first metal precursor solution and a second metal precursor solution, a concentration of the first metal precursor solution is $2.3 \times 10^{-4}$ M to $1.4 \times 10^{-2}$ M, a concentration of the second metal precursor solution is $4.6 \times 10^{-4}$ M to $2.9 \times 10^{-2}$ M, and a concentration of the calcium acetate solution is 1 M to 1.5 M.

4. The method of claim 2, wherein an affinity of the aqueous liquid and the alcohol is greater than an affinity of the calcium acetate and the alcohol.

5. The method of claim 2, wherein in the step of dissolving the photocatalyst precursor in the paste in the aqueous liquid, the alcohol and the photocatalyst precursor dissolved in the alcohol are dissolved in the aqueous liquid together.

6. The method of claim 1, wherein the aqueous liquid comprises water or aqueous sodium hydroxide.

7. The method of claim 1, wherein $B^{3+}$ represents $Fe^{3+}$ and the second metal precursor is a ferric compound.

8. The method of claim 1, wherein a particle size of the photocatalyst is 1 nm to 10 nm.

\* \* \* \* \*